US006035808A

United States Patent [19]

Herman

[11] Patent Number: 6,035,808

[45] Date of Patent: Mar. 14, 2000

[54] ANIMAL CATCHING AND CARRYING DEVICE

[76] Inventor: Guy D. Herman, HC 80 Box 37, Presho, S. Dak. 57568

[21] Appl. No.: 09/105,454

[22] Filed: Jun. 26, 1998

[51] Int. Cl.[7] .......................... A01K 15/00; A01K 29/00

[52] U.S. Cl. .......................... 119/732; 119/752; 119/512

[58] Field of Search .......................... 119/751, 752, 119/729, 732, 510, 512, 519, 453

[56] References Cited

U.S. PATENT DOCUMENTS

| | | | |
|---|---|---|---|
| 1,298,996 | 4/1919 | Milian | 293/16 |
| 3,095,858 | 7/1963 | Bauer | 119/744 |
| 3,900,009 | 8/1975 | Rodrigues | 119/752 |
| 3,931,796 | 1/1976 | Hoffman | 119/801 |
| 4,201,157 | 5/1980 | Lambert | 119/752 |
| 4,590,887 | 5/1986 | Holopainen | 119/723 |
| 4,696,374 | 9/1987 | Hale | 182/127 |
| 4,942,846 | 7/1990 | Reinhold et al. | 119/751 |
| 5,090,368 | 2/1992 | Berghoefer | 119/843 |
| 5,186,125 | 2/1993 | Halyung | 119/712 |
| 5,289,801 | 3/1994 | Burks | 119/728 |
| 5,372,092 | 12/1994 | Pederson | 118/510 |
| 5,393,194 | 2/1995 | Smith | 414/546 |
| 5,655,484 | 8/1997 | Aaberg | 119/735 |
| 5,669,332 | 9/1997 | Riley | 119/724 |
| 5,785,006 | 7/1998 | Prentice | 119/732 |

*Primary Examiner*—Michael J. Carone
*Assistant Examiner*—James S. Bergin

[57] ABSTRACT

An animal catching and carrying device for mounting to a vehicle. The inventive device includes a cage extending from the front of a vehicle. The cage has a back portion and a pair of sides extending from the back portion. The back portion of the cage has a mounting member that is coupled to the vehicle. First and second gate members are pivotally coupled to the sides of the cage. The gate members are positionable between a catching position and a trapped position. The front ends of the gate members are spaced apart when the gate members are in the catching position. The front ends of the gate members are positioned together when the gate members are in the trapped position.

17 Claims, 3 Drawing Sheets

FIG 1
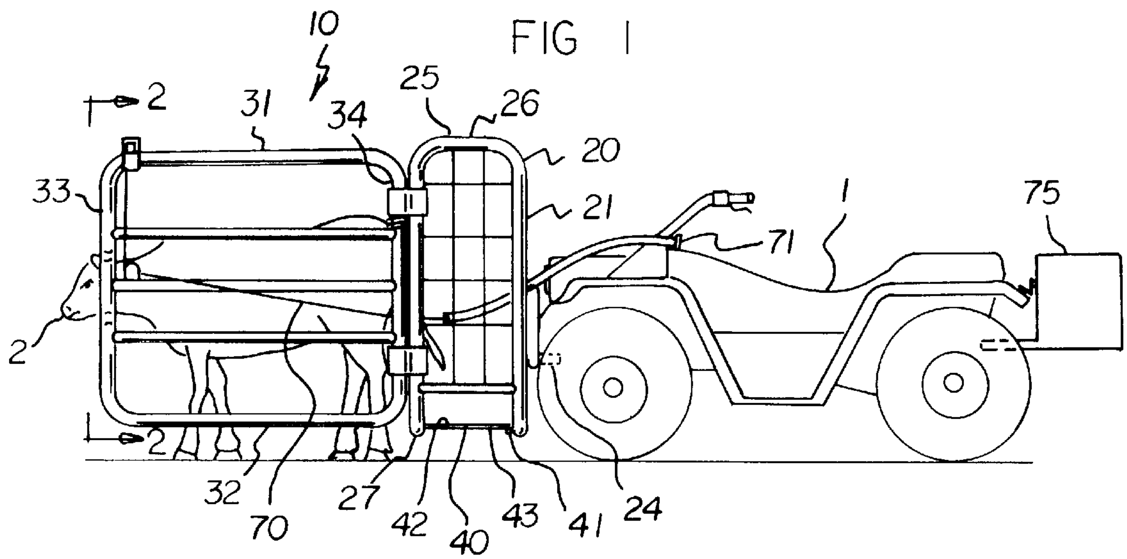
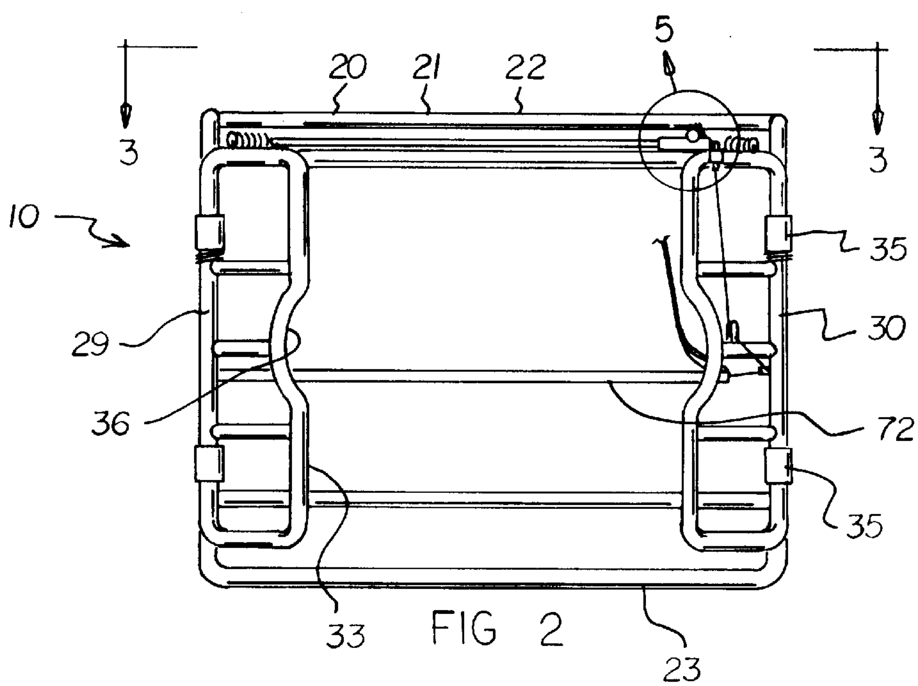
FIG 2

FIG 5
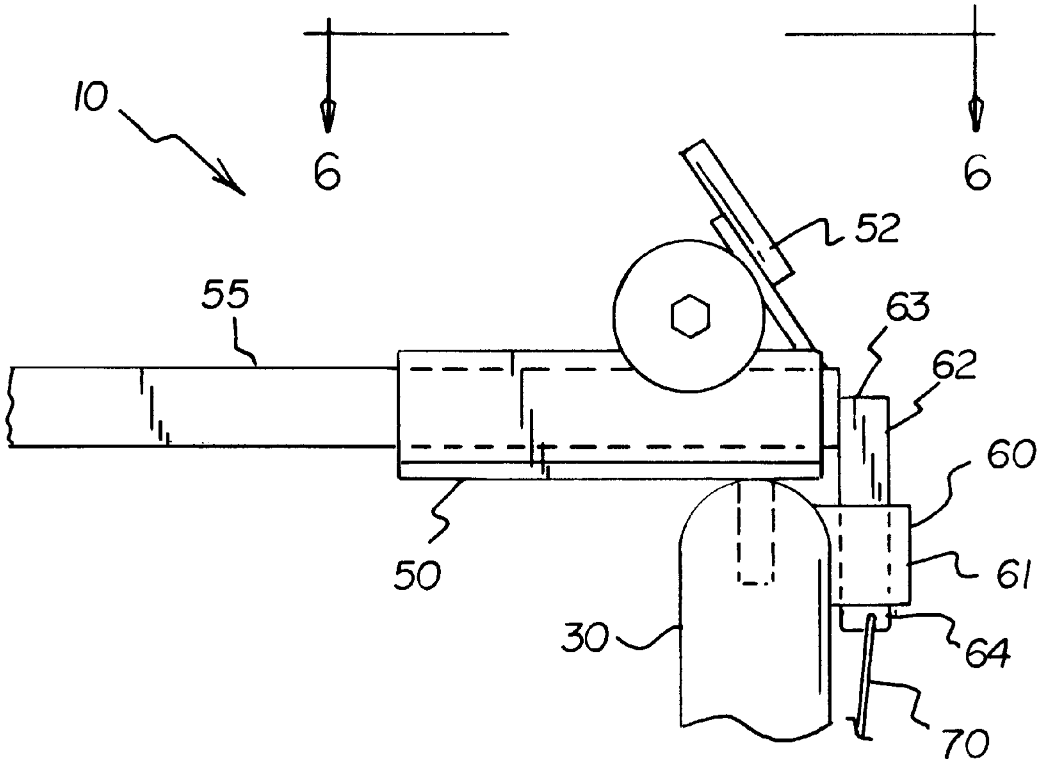
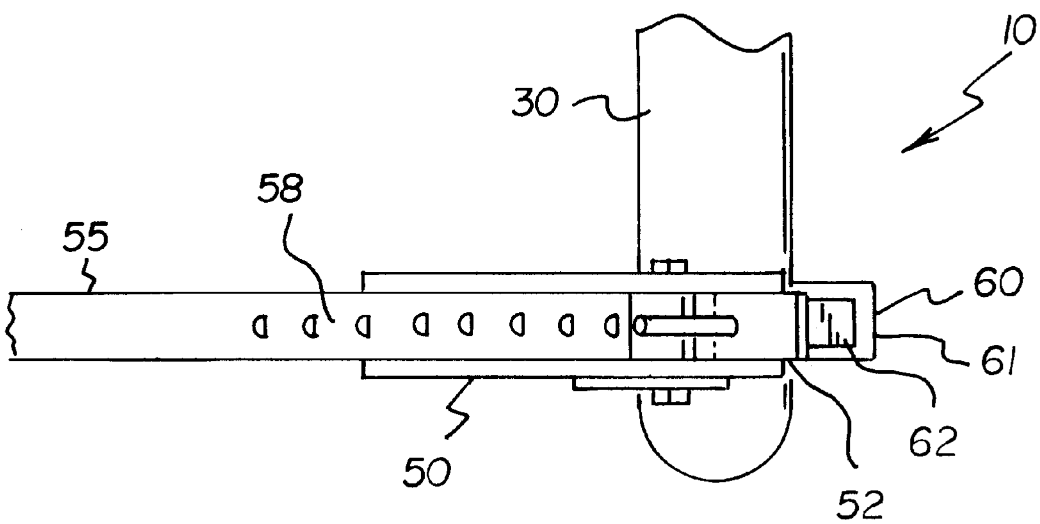
FIG 6

ANIMAL CATCHING AND CARRYING DEVICE

BACKGROUND OF THE INVENTION

1. Field of the Invention

The present invention relates to animal handling devices and more particularly pertains to a new animal catching and carrying device for mounting to a vehicle.

2. Description of the Prior Art

The use of animal handling devices is known in the prior art. More specifically, animal handling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art animal handling devices include U.S. Pat. No. 5,289,801; U.S. Pat. No. 5,090,368; U.S. Pat. No. 4,201,157; U.S. Pat. No. 4,696,374; U.S. Pat. No. 5,393,194; and U.S. Pat. No. 3,931,796.

While these devices fulfill their respective, particular objectives and requirements, the aforementioned patents do not disclose a new animal catching and carrying device. The inventive device includes a cage extending from the front of a vehicle. The cage has a back portion and a pair of sides extending from the back portion. The back portion of the cage has a mounting member that is coupled to the vehicle. First and second gate members are pivotally coupled to the sides of the cage. The gate members are positionable between a catching position and a trapped position. The front ends of the gate members are spaced apart when the gate members are in the catching position. The front ends of the gate members are positioned together when the gate members are in the trapped position.

In these respects, the animal catching and carrying device according to the present invention substantially departs from the conventional concepts and designs of the prior art, and in so doing provides an apparatus primarily developed for the purpose of mounting to a vehicle.

SUMMARY OF THE INVENTION

In view of the foregoing disadvantages inherent in the known types of animal handling devices now present in the prior art, the present invention provides a new animal catching and carrying device construction wherein the same can be utilized for mounting to a vehicle.

The general purpose of the present invention, which will be described subsequently in greater detail, is to provide a new animal catching and carrying device apparatus and method which has many of the advantages of the animal handling devices mentioned heretofore and many novel features that result in a new animal catching and carrying device which is not anticipated, rendered obvious, suggested, or even implied by any of the prior art animal handling devices, either alone or in any combination thereof.

To attain this, the present invention generally comprises a cage extending from the front of a vehicle. The cage has a back portion and a pair of sides extending from the back portion. The back portion of the cage has a mounting member that is coupled to the vehicle. First and second gate members are pivotally coupled to the sides of the cage. The gate members are positionable between a catching position and a trapped position. The front ends of the gate members are spaced apart when the gate members are in the catching position. The front ends of the gate members are positioned together when the gate members are in the trapped position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new animal catching and carrying device apparatus and method which has many of the advantages of the animal handling devices mentioned heretofore and many novel features that result in a new animal catching and carrying device which is not anticipated, rendered obvious, suggested, or even implied by any of the prior art animal handling devices, either alone or in any combination thereof.

It is another object of the present invention to provide a new animal catching and carrying device which may be easily and efficiently manufactured and marketed.

It is a further object of the present invention to provide a new animal catching and carrying device which is of a durable and reliable construction.

An even further object of the present invention is to provide a new animal catching and carrying device which is susceptible of a low cost of manufacture with regard to both materials and labor, and which accordingly is then susceptible of low prices of sale to the consuming public, thereby making such animal catching and carrying device economically available to the buying public.

Still yet another object of the present invention is to provide a new animal catching and carrying device which provides in the apparatuses and methods of the prior art some of the advantages thereof, while simultaneously overcoming some of the disadvantages normally associated therewith.

Still another object of the present invention is to provide a new animal catching and carrying device for mounting to a vehicle.

Yet another object of the present invention is to provide a new animal catching and carrying device which includes a cage extending from the front of a vehicle. The cage has a back portion and a pair of sides extending from the back portion. The back portion of the cage has a mounting member that is coupled to the vehicle. First and second gate members are pivotally coupled to the sides of the cage. The gate members are positionable between a catching position and a trapped position. The front ends of the gate members are spaced apart when the gate members are in the catching position. The front ends of the gate members are positioned together when the gate members are in the trapped position.

Still yet another object of the present invention is to provide a new animal catching and carrying device that can catch an animal on the run with less risk of injury to the user and the animal.

Even still another object of the present invention is to provide a new animal catching and carrying device that permits selective trapping of an animal without having to corral the whole herd.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new animal catching and carrying device according to the present invention.

FIG. 2 is a side view of the present invention taken from Line 2—2 of FIG. 1.

FIG. 5 is a detailed view of the present invention taken from Circle 5 of FIG. 2.

FIG. 6 is a detailed view of the present invention taken from Line 6—6 of FIG. 5.

DESCRIPTION OF THE PREFERRED EMBODIMENT

Figure 3:
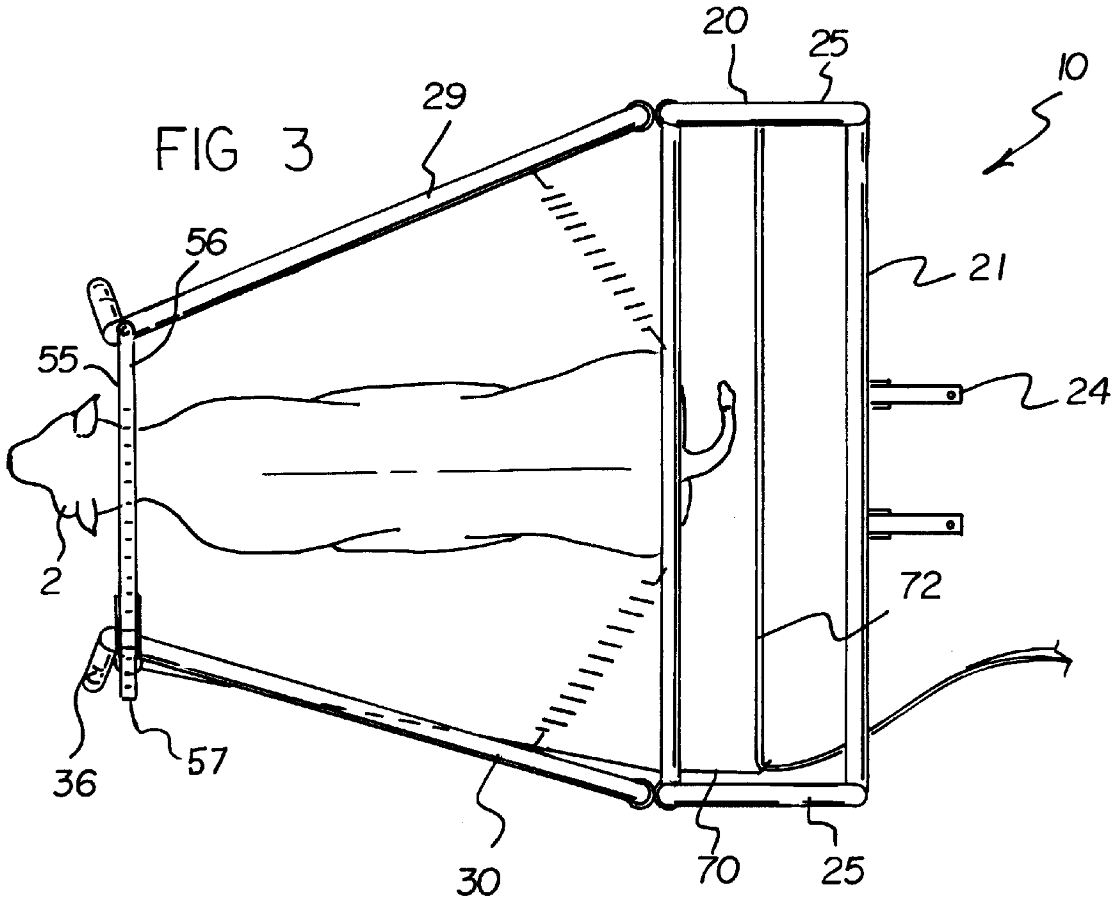
FIG. 3 is a top side view of the present invention taken from Line 3—3 of FIG. 2.

With reference now to the drawings, and in particular to FIGS. 1 through 6 thereof, a new animal catching and carrying device embodying the principles and concepts of the present invention and generally designated by the reference numeral 10 will be described.

As best illustrated in FIGS. 1 through 6, the animal catching and carrying device 10 comprises a cage 20 extending from the front of a vehicle 1. The cage 20 has a back portion 21 and a pair of sides 25 extending from the back portion 21. The back portion 21 of the cage 20 has a mounting member 24 that is coupled to the vehicle 1. First and second gate members 29,30 are pivotally coupled to the sides 25 of the cage 20. The gate members 29,30 are positionable between a catching position and a trapped position. The front ends 33 of the gate members 29,30 are spaced apart when the gate members 29,30 are in the catching position. The front ends 33 of the gate members 29,30 are positioned together when the gate members 29,30 are in the trapped position.

Figure 4:
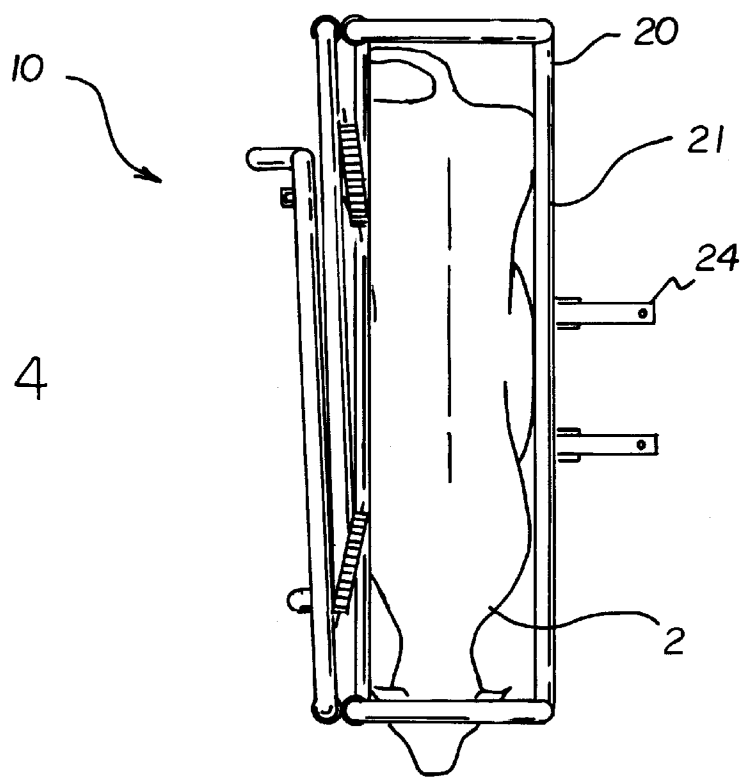
FIG. 4 is a top side view of the present invention.

The back portion 21 of the cage 20 has an upper end 22, a lower end 23, and at least one mounting member 24, but preferably two, as shown in FIGS. 3 and 4. Preferably, the mounting members 24 mount to the front of a vehicle 1. Ideally, the animal catching and carrying device 10 is mounted to the front of a all-terrain vehicle such as a three-wheeler or four-wheeler, but may also be mounted to a larger vehicle, such as a pickup truck.

The first and second gate members 29,30 are each pivotally coupled to one of the sides 25 of the cage 20, preferably by a hinge 35. Each of the gate members 29,30 has a top end 31, a bottom end 32, a front end 33, and a rear end 34. Each of the front ends 33 of the gate members 29,30 also have a concave indented portion 36.

Preferably, the height of the gate members 29,30 is about the same as the distance between the upper and lower ends 22,23 of the back portion 21 of the cage 20. Also preferably, the cage 20 and gate members 29,30 are made from round tubing for less weight and to avoid potential injury to the animal 2 being caught.

The gate members 29,30 are positionable between a catching position and a trapped position. Ideally, the front ends 33 of the gate members 29,30 are spaced apart between about 2 and 5 feet to permit passage of an animal 2 therebetween when the gate members 29,30 are in the catching position. The front ends 33 of the gate members 29,30 are positioned together to trap an animal's neck therebetween when the gate members 29,30 are in the trapped position. The concavities of the concave indented portions 36 are directed towards each other such that the concave indented portions 36 of the front ends 33 of the gate members 29,30 come together to form a generally circular neck opening for enclosing the neck of an animal 2 therein, thereby trapping the neck of the animal 2 in the neck opening created by the indented portions, when the front ends 33 of the gate members 29,30 are in the trapped position.

Preferably, the gate members 29,30 are further positionable between a catching position, a trapped position, and a transporting position. As best illustrated in FIG. 4, the front ends 33 of the gate members 29,30 are positioned towards the sides 25 of the cage 20 to trap an animal 2 in the cage 20 so that the animal 2 may be transported when the gate members 29,30 are in the transporting position. Ideally, the first and second gate members 29,30 are biased from the catching position towards the transporting position.

Also preferably, the animal catching and carrying device 10 further comprises a platform 40 that is pivotally coupled to the lower end 23 of the back portion 21 by a hinge 41. The platform 40 permits the transportation of animals 2 in the cage 20. The platform 40 has an upper surface 42 and a lower surface 43 and is movable between a raised position and a lowered position. The upper surface 42 of the platform 40 is substantially parallel the back portion 21 of the cage 20 when the platform 40 is in the raised position. The upper surface 42 of the platform 40 is substantially perpendicular the back portion 21 of the cage 20 when the platform 40 is in the lowered position.

In an alternate embodiment not requiring a platform 40, the animal catching and carrying device 10 includes a cross member (not shown) and a lifting mechanism (not shown). Each of the sides 25 of the cage 20 have opposite first and second ends 26,27. The first end 26 of each of the sides 25 is positioned towards the upper end 22 of the back portion 21 of the cage 20. The cross member (not shown) extends across the first ends 26 of the sides 25 of the cage 20. The lifting mechanism (not shown) is coupled to the cross member. The lifting mechanism has a lifting means (not shown) and a strap (not shown) depending from the lifting means. The strap extends around an animal 2 held in the cage 20 and the lifting means tightens the strap, thereby lifting the animal 2 and suspending the animal 2 above the ground.

Preferably, the animal catching and carrying device 10 further comprises a ratchet receiving tube 50 and a ratchet member 55. The ratchet receiving tube 50 is coupled to the top end 31 of the first gate member 29.

The ratchet receiving tube 50 having a pawl 52 thereon. The ratchet member 55 extends from the top end 31 of the second gate member 30 and has a hinged end 56, a primary end 57, and a toothed portion 58 extending between the ends 56,57 of the ratchet member 55. The ratchet member 55 is slidably insertable in the ratchet receiving tube 50. Ideally, the ratchet receiving tube 50 is positioned towards the front end 33 of the first gate member 29. Also ideally, ratchet member 55 is positioned towards the front end 33 of the second gate member 30.

The ratchet member 55 is slidable through the ratchet receiving tube 50 in a first direction and a second direction. The ratchet member 55 slides in the first direction as the gate members 29,30 move from a catching position to a trapped position. The ratchet member 55 slides in the second direction as the gate members 29,30 move from a trapped position to a catching position. The pawl 52 releasably engages the toothed portion 58 of the ratchet member 55. The pawl 52 permits the ratchet member 55 to move in the first direction thereby permitting the gate members 29,30 to move from the catching position towards the trapped position. The pawl 52 selectively prevents movement of the ratchet member 55 in the second direction thereby limiting the movement of the gate members 29,30 from the trapped position towards the catching position.

Ideally, the animal catching and carrying device 10 further comprises a spring lock 60 having a pin 62 and a housing 61. The pin 62 has a proximal end 63 and a distal end 64 and is positionable between an engaged position and a released position. The proximal end 63 of the pin 62 of the spring lock 60 abuts the primary end 57 of the ratchet member 55 to keep the ratchet member 55 from sliding through the ratchet member 55 receiving tube 50 when the gate members 29,30 are in the catching position and the pin 62 of the spring lock 60 is in the engaged position. The pin 62 of the spring lock 60 permits the ratchet member 55 to slide through the ratchet receiving tube 50 when the pin 62 is in the released position. The pin 62 is biased towards the engaged position. A spring (not shown) may be used to produce the biasing.

Also ideally, the animal catching and carrying device 10 further comprises a release cable 70 for pulling the pin 62 of the spring lock 60 towards a released position, thereby releasing the ratchet member 55 and allowing the biasing of the gate members 29,30 to move the gate members 29,30 towards a trapped position. The release cable 70 extends between the distal end 64 of the pin 62 of the spring lock 60 and the vehicle 1. A handle 71 that is coupled to the release cable 70 may be mounted on the vehicle 1.

Alternatively or in combination with the release cable 70, a trip cable 72 may be extended between the sides 25 of the cage 20. The trip cable 72 is coupled to the spring pin 62 for pulling the pin 62 of the spring lock 60 towards the released position when an animal 2 approaches the back portion 21 of the cage 20 and abuts the trip cable 72. Ideally, the trip cable 72 is coupled to the release cable 70. The trip cable 72 pulls the release cable 70, which pulls the pin 62.

Preferably, a counterweight 75 extends from the rear of the vehicle 1 to counterbalance the weight load caused by the cage 20, gate members 29,30, and animal 2 trapped in the cage 20.

In use, the animal catching and carrying device 10 is mounted to a vehicle 1. The gate members 29,30 are positioned in the catching position. The vehicle 1 is driven such that an animal 2 passes between the front ends 33 of the gate members 29,30. The release cable 70 is pulled and the gate members 29,30 move towards a trapped position. The animal's neck becomes trapped in the neck opening created by the concave indented portions 36 of the front ends 33 of the gate members 29,30.

To transport an animal 2, the platform 40 of the cage 20 is placed in a lowered position and the animal 2 is positioned on the platform 40. The gate members 29,30 are positioned in a transporting position to keep the animal 2 in the cage 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An animal catching and carrying device for mounting to a vehicle, said animal catching and carrying device comprising:

a cage extending from the front of the vehicle, said cage having a back portion and a pair of sides extending from said back portion;

said back portion of said cage having an upper end, a lower end, and a mounting member for mounting to a vehicle, said mounting member of said back portion of said cage being coupled to the vehicle;

first and second gate members, each of said gate members being pivotally coupled to one of said sides of said cage, each of said gate members having a top end, a bottom end, a front end, and a rear end;

said gate members being positionable between a catching position and a trapped position;

said front ends of said gate members being spaced apart when said gate members are in said catching position; and said front ends of said gate members being positioned together when said gate members are in said trapped position; wherein each of said front ends of said gate members have a concave indented portion, said concave indented portions of said front ends of said gate members coming together to form a generally circular neck opening for enclosing the neck of an animal therein when said front ends of said gate members are in said trapped position.

2. The animal catching and carrying device of claim 1, wherein said gate members are further positionable between a catching position, a trapped position, and a transporting position, said front ends of said gate members being positioned towards said sides of said cage when said gate members are in said transporting position.

3. The animal catching and carrying device of claim 2, wherein said first and second gate members are biased towards said transporting position.

4. The animal catching and carrying device of claim 1, further comprising a counterweight extending from the vehicle.

5. An animal catching and carrying device for mounting to a vehicle, said animal catching and carrying device comprising:

a cage extending from the front of the vehicle, said cage having a back portion and a pair of sides extending from said back portion;

said back portion of said cage having an upper end, a lower end, and a mounting member for mounting to a vehicle, said mounting member of said back portion of said cage being coupled to the vehicle;

first and second gate members, each of said gate members being pivotally coupled to one of said sides of said cage, each of said gate members having a top end, a bottom end, a front end, and a rear end;

said gate members being positionable between a catching position and a trapped position;

said front ends of said gate members being spaced apart when said gate members are in said catching position;

said front ends of said gate members being positioned together when said gate members are in said trapped position; and a platform being pivotally coupled to said lower end of said back portion.

6. The animal catching and carrying device of claim 5, wherein said gate members are further positionable between a catching position, a trapped position, and a transporting position, said front ends of said gate members being positioned towards said sides of said cage when said gate members are in said transporting position.

7. The animal catching and carrying device of claim 6, wherein said first and second gate members are biased towards said transporting position.

8. The animal catching and carrying device of claim 5, further comprising a counterweight extending from the vehicle.

9. An animal catching and carrying device for mounting to a vehicle, said animal catching and carrying device comprising:

a cage extending from the front of the vehicle, said cage having a back portion and a pair of sides extending from said back portion;

said back portion of said cage having an upper end, a lower end, and a mounting member for mounting to a vehicle, said mounting member of said back portion of said cage being coupled to the vehicle;

first and second gate members, each of said gate members being pivotally coupled to one of said sides of said cage, each of said gate members having a top end, a bottom end, a front end, and a rear end;

said gate members being positionable between a catching position and a trapped position;

said front ends of said gate members being spaced apart when said gate members are in said catching position;

said front ends of said gate members being positioned together when said gate members are in said trapped position; and a ratchet receiving tube and a ratchet member, said ratchet receiving tube being coupled to said top end of said first gate member, said ratchet receiving tube having a pawl thereon, said ratchet member extending from said top end of said second gate member and having a hinged end, a primary end, and a toothed portion extending between the ends of the ratchet member, said ratchet member being slidably insertable in said ratchet receiving tube.

10. The animal catching and carrying device of claim 9, wherein said ratchet member is slidable through said ratchet receiving tube in a first direction and a second direction, said ratchet member sliding in said first direction as said gate members move from a catching position to a trapped position, said ratchet member sliding in said second direction as said gate members move from a trapped position to a catching position, said pawl releasably engaging said toothed portion of said ratchet member, said pawl permitting said ratchet member to move in said first direction, said pawl selectively preventing movement of said ratchet member in said second direction.

11. The animal catching and carrying device of claim 10, further comprising a spring lock having a pin and a housing, said pin having a proximal end and a distal end, said pin being positionable between an engaged position and a released position, said proximal end of said pin of said spring lock abutting said primary end of said ratchet member when said gate members are in said catching position and said pin of said spring lock is in said engaged position, said pin of said spring lock permitting said ratchet member to slide through said ratchet receiving tube when said pin is in said released position, said pin being biased towards said engaged position.

12. The animal catching and carrying device of claim 11, further comprising a release cable for pulling said pin of said spring lock towards a released position, said release cable extending between said distal end of said pin of said spring lock and the vehicle.

13. The animal catching and carrying device of claim 11, further comprising a trip cable being extended between said sides of said cage, said trip cable being coupled to a spring pin for pulling said pin of said spring lock towards said released position when an animal approaches said back portion of said cage and abuts said trip cable.

14. The animal catching and carrying device of claim 9, wherein said gate members are further positionable between a catching position, a trapped position, and a transporting position, said front ends of said gate members being positioned towards said sides of said cage when said gate members are in said transporting position.

15. The animal catching and carrying device of claim 14, wherein said first and second gate members are biased towards said transporting position.

16. The animal catching and carrying device of claim 9, further comprising a counterweight extending from the vehicle.

17. An animal catching and carrying device for mounting to a vehicle, said animal catching and carrying device comprising:

a cage extending from the front of the vehicle, said cage having a back portion and a pair of sides extending from said back portion;

said back portion of said cage having an upper end, a lower end, and a mounting member for mounting to a vehicle, said mounting member of said back portion of said cage being coupled to the vehicle;

a platform being pivotally coupled to said lower end of said back portion;

first and second gate members, each of said gate members being pivotally coupled to one of said sides of said cage, each of said gate members having a top end, a bottom end, a front end, and a rear end, each of said front ends of said gate members having a concave indented portion;

said gate members being positionable between a catching position, a trapped position, and a transporting position;

said front ends of said gate members being spaced apart when said gate members are in said catching position;

said front ends of said gate members being positioned together when said gate members are in said trapped position, said concave indented portions of said front ends of said gate members coming together to form a generally circular neck opening for enclosing the neck of an animal therein when said front ends of said gate members are in said trapped position;

said front ends of said gate members being positioned towards said sides of said cage when said gate members are in said transporting position;

said first and second gate members being biased towards said transporting position;

a ratchet receiving tube being coupled to said top end of said first gate member, said ratchet receiving tube having a pawl thereon;

a ratchet member extending from said top end of said second gate member and having a hinged end, a primary end, and a toothed portion extending between the ends of the ratchet member, said ratchet member being slidably insertable in said ratchet receiving tube;

said ratchet member being slidable through said ratchet receiving tube in a first direction and a second direction, said ratchet member sliding in said first direction as said gate members move from a catching position to a trapped position, said ratchet member sliding in said second direction as said gate members move from a trapped position to a catching position;

said pawl releasably engaging said toothed portion of said ratchet member, said pawl permitting said ratchet member to move in said first direction, said pawl selectively preventing movement of said ratchet member in said second direction;

a spring lock having a pin and a housing, said pin having a proximal end and a distal end, said pin being positionable between an engaged position and a released position, said proximal end of said pin of said spring lock abutting said primary end of said ratchet member when said gate members are in said catching position and said pin of said spring lock is in said engaged position, said pin of said spring lock permitting said ratchet member to slide through said ratchet receiving tube when said pin is in said released position, said pin being biased towards said engaged position;

a release cable for pulling said pin of said spring lock towards a released position, said release cable extending between said distal end of said pin of said spring lock and the vehicle;

a trip cable being extended between said sides of said cage, said trip cable being coupled to said release cable for pulling said pin of said spring lock towards said released position when an animal approaches said back portion of said cage and abuts said trip cable; and a counterweight extending from the vehicle.

* * * * *